United States Patent [19]
Manabe

[11] Patent Number: 5,958,032
[45] Date of Patent: Sep. 28, 1999

[54] DATA PROCESSING AND COMMUNICATING SYSTEM WITH HIGH THROUGHPUT PERIPHERAL COMPONENT INTERCONNECT BUS

[75] Inventor: Masao Manabe, Tokyo, Japan

[73] Assignee: NEC Corporation, Tokyo, Japan

[21] Appl. No.: 08/895,984

[22] Filed: Jul. 17, 1997

[30] Foreign Application Priority Data

Jul. 22, 1996 [JP] Japan ................................ 8-192152

[51] Int. Cl.⁶ .................................................. G06F 13/40
[52] U.S. Cl. ........................................ 710/126; 710/128
[58] Field of Search ................................... 710/126, 128, 710/129, 101, 102

[56] References Cited

U.S. PATENT DOCUMENTS

| | | | |
|---|---|---|---|
| 5,553,310 | 9/1996 | Taylor et al. ........................... | 395/860 |
| 5,594,882 | 1/1997 | Bell ......................................... | 395/212 |
| 5,613,075 | 3/1997 | Wade et al. ............................. | 395/287 |
| 5,768,548 | 6/1998 | Young et al. ........................... | 395/309 |

FOREIGN PATENT DOCUMENTS

| | | |
|---|---|---|
| 6-139186 | 5/1994 | Japan . |
| 7-121474 | 5/1995 | Japan . |
| 84103242 | 4/1995 | Taiwan . |
| 86110207 | 7/1998 | Taiwan . |

OTHER PUBLICATIONS

John P. Hayes "Computer Architecture and Oganization", pp. 409–417, 1978.

*Primary Examiner*—Ayaz R. Sheikh
*Assistant Examiner*—Xuong Chung-Trans
*Attorney, Agent, or Firm*—Sughrue, Mion, Zinn, Macpeak & Seas, PLLC

[57] ABSTRACT

A data communication system has a host bus connected to a central processing unit and a system memory, a peripheral component interconnect bus connected to a communication device equipped with a first state machine and a second state machine independently requesting a right to use the peripheral component interconnect bus and a bus bridge circuit connected between the host bus and the peripheral component interconnect bus and having a first-in-first-out memory for data read-out, and the bus first-in-first-out memory for data write-in and another bridge circuit assigns the right to use the peripheral component interconnect bus to the second state machine so as to transfer write-in data codes through the peripheral component interconnect bus to the first-in-first-out memory for data write-in until completion of a data transfer from the system memory through the host bus to the first-in-first-out memory for data read-out, thereby improving the throughput of the peripheral component interconnect bus.

4 Claims, 3 Drawing Sheets

DATA PROCESSING AND COMMUNICATING SYSTEM WITH HIGH THROUGHPUT PERIPHERAL COMPONENT INTERCONNECT BUS

FIELD OF THE INVENTION

This invention relates to a data processing and communicating system and, more particularly, to a data processing and communicating system with a high throughput peripheral component interconnect bus.

DESCRIPTION OF THE RELATED ART

A bus system is an indispensable component of an electronic system, and various kinds of bus system have been proposed. A host bus system is directly connected to a central processing unit. On the other hand, a peripheral component interconnect bus system is connected through a bus bridge circuit to the central processing unit. If the host bus system and the peripheral component interconnect bus system are incorporated in a data processing unit and other component devices independently use both bus systems.

The peripheral component interconnect bus system is classified into a bus mater technology, and the peripheral component interconnect bus system can be assigned to any component device for transferring data to a destination. The component device assigned the bus system is called as "initiator", and the destination as "target".

The central processing unit can access a component device on the peripheral component interconnect bus system through the bus bridge circuit, and an initiator can specify a system memory on the host bus system as a target.

When more than one component device concurrently requests an access to the peripheral component interconnect bus system, the bus bridge circuit serves as all arbiter, and allows one of the component devices to access the peripheral component interconnect bus system. A first-in-first-out memory guarantees the independence between the peripheral component interconnect bus system and the host bus system.

However, the performance of the peripheral component interconnect bus system is dependent on the bus bridge circuit and the component devices, and does not satisfy system designers.

FIG. 1 illustrates a typical example of a data processing/communicating system. A host bus 1 and a peripheral component interconnect bus 2 are incorporated in the prior art data processing/communicating system. A central processing unit 3 and a system memory 4 are connected between the host bus 1, and a bus bridge circuit 5 is connected between the host bus 1 and the peripheral component interconnect bus 2. Three component devices 6, 7 and 8 are connected to the peripheral component interconnect bus 2, and the component device 6 is assumed to serve as the initiator in the following description.

The central processing unit 3 frequently accesses the system memory 4 through the host bus 1, and, for this reason, the host bus 1 is rarely assigned to the component devices 6, 7 and 8. When the component device 6 accesses the system memory 4, the component device 6 needs not only the right to use the host bus system but also the right to use the peripheral component interconnect bus 2. Although the right to use the peripheral component interconnect bus 2 is easily granted to the initiator 6, the grant for the host bus 1 is hardly obtained due to the use by the central processing unit 3. For this reason, the component device 6 waits for the grant to access the host bus 1, and the initiator continously maintains the right to use the peripheral component inter connect bus 2. Thus, when a component device on the peripheral component interconnect bus 1 communicates with a component device on the host bus, the status of the host bus 1 affects the performance of the peripheral component interconnect bus 2, and the component device stands idle during the busy status of the host bus 1.

A posted write technology has been proposed. A first-in-first-out memory is provided in the bus bridge circuit 5, and the initiator 6 writes data into the first-in-first-out memory. When the data is stored in the first-in-first-out memory, the data phase is assumed to be completed, and the peripheral component interconnect bus 2 becomes accessible by another component device. The bus bridge circuit 5 transfers the data from the first-in-first-out memory to the system memory 4 when the host bus 1 becomes open. Thus, the posted write technology improves the performance of the peripheral component interconnect bus 2.

However, the prior art posted write technology only removes the delay from a data write-in to the system memory 4. When the component device 6 tries to fetch data stored in the system memory 4, the data is directly transferred from the system memory 4 through the host bus 1 and the peripheral component interconnect bus 2 to the component device 6. Therefore, the component device 6 requires the right to use the peripheral component interconnect bus 2 and the right to use the host bus 1 in order to fetch the data stored in the system memory 4. However, if the host bus 1 is continuously busy, the component device 6 maintains tile right to use the peripheral component interconnect bus 2, and waits for the grant to access the host bus 1. For this reason, the bus bridge circuit 5 can not grant the right to use the peripheral component device 7/8, and the throughput of the peripheral component interconnect bus 2 is decreased. Such long wait may be resulted from the grant to access the peripheral component interconnect bus 2 under the busy status of the host bus 1. Especially, when the busy status is continued for long time, the bus bridge circuit 5 requests the component device 6 to retry the access, and rejects tile bus request. In this situation, the component device 6 repeats the bus request to tile bus bridge circuit 5; however, the component device 6 continously maintains the right to use the peripheral component interconnect bus 2. This means that other component devices can not use the peripheral component interconnect bus 2. Moreover, even if the component device 6 needs to write new data into the system memory 4 during the repetition of the bus request for the read-out from the system memory 4, the write request is postponed until the completion of the read-out. If the component device 6 is a communication device, the read-out request from the system memory 4 is carried out for a transmitting data, and the write-in request takes place for storing a receiving data into the system memory. However, if the write-in request is postponed for long time, the receiving data may be lost.

Even if the right to use the peripheral component interconnect bus 2 is granted to the component device 6 under the idling status of the host bus 1, the central processing unit is prioritized rather than the component device 6, and the central processing unit 3 interrupts the data transfer from the system memory 4 to the component device 6. This results in the long wait.

SUMMARY OF THE INVENTION

It is therefore an important object of the present invention to provide a data processing/communicating system which improves the throughput of a peripheral component interconnect bus system.

To accomplish the object, the present invention proposes to provide a temporary data storage in a bus bridge circuit for storing read-out information.

In accordance with one aspect of the present invention there is provided a data processing system comprising: a first data processing sub-system including a memory for storing first pieces of information, a bus connected to the memory for propagating the first pieces of information from the memory, and a first component device connected to the bus, having a first priority and communicable through the bus with the memory; and a second data processing sub-system including a peripheral component interconnect bus for propagating the first pieces of information and second pieces of information, at least one second component device connected to the peripheral component interconnect bus and supplying the second pieces; of information to the peripheral component interconnect bus, and a bus bridge circuit connected to the bus and the peripheral component interconnect bus, having a second priority lower than the first priority and a first temporary memory for storing the first pieces of information and assigning a right to use the peripheral component interconnect bus to the at least one second component device so as to allow the at least one second component device to supply the second pieces of information to the peripheral component interconnect bus until a data transfer of the first pieces of information to the first temporary memory is completed.

BRIEF DESCRIPTION OF THE DRAWINGS

The features and advantages of the data processing/communicating system will be more clearly understood from the following description take in conjunction with the accompanying drawings in which.

DESCRIPTION OF THE PREFERRED EMBODIMENTS

First Embodiment

Figure 1:
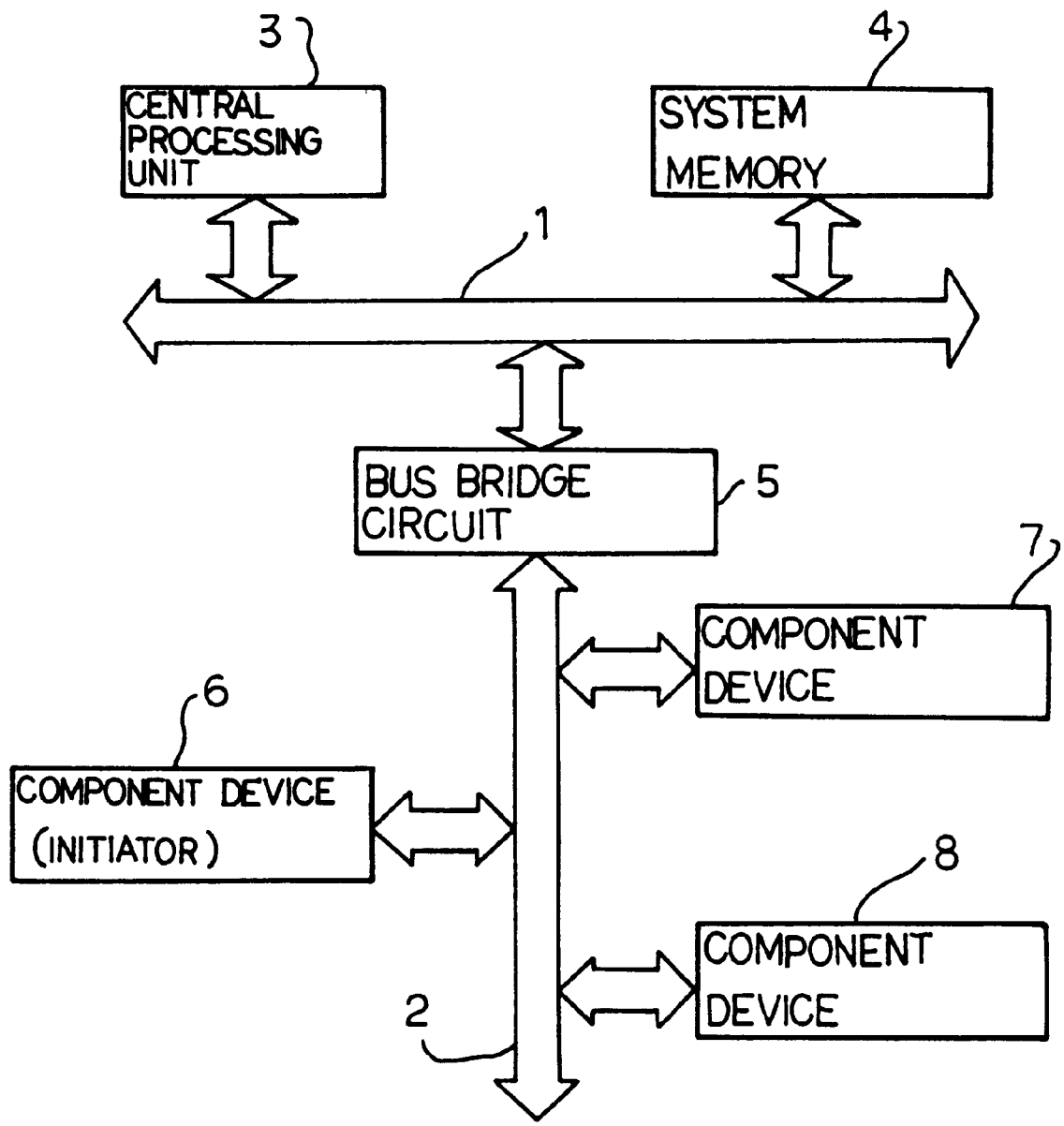
FIG. 1 is a block diagram showing the arrangement of the prior art data processing/communicating system.
Figure 2:
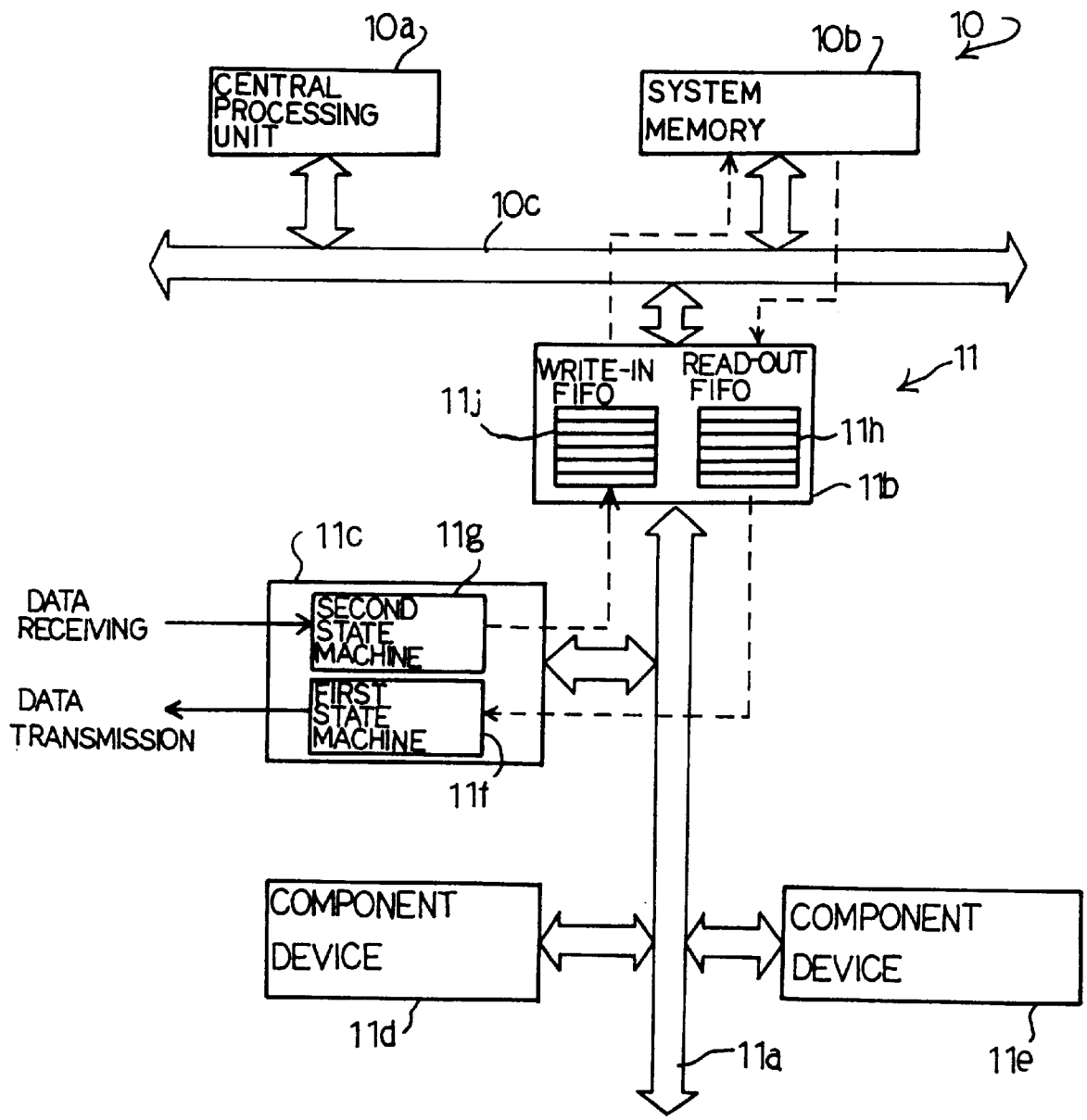
FIG. 2 is a block diagram showing the arrangement of a data processing/communicating system according to the present invention.

Referring to FIG. 2 of the drawings, a data processing/communicating system embodying the present invention largely comprises a data processing sub-system 10 and a data communication sub-system 11. The data processing sub-system 10 includes a central processing unit 10a, a system memory 10b and a host bus 10c connected to the central processing unit 10a and the system memory 10b. The central processing unit 10a fetches data codes stored in the system memory 10b through the host 10c and processes the data information in the data codes. The system memory 10b is shared between the data processing sub-system 10 and the communication sub-system 11, and the communication sub-system 11 writes data codes into and reads out them form the system memory 10b.

The communications sub-system 11 includes a peripheral component interconnect bus 11a, a bus bridge circuit 11b and a plurality of component devices 11c, 11d and 11e. The bus bridge circuit 11b is connected to the host bus 11c, and the bus bridge circuit 11b and the component devices 11c/11d/11e are connected to the peripheral component interconnect bus 11a. For this reason, each of the devices 11c/11d/11e writes data codes into and reads out the data codes from the system 10b through the peripheral component interconnect bus 11a, the bus bridge circuit 11b and the host bus 10c.

At least one of the component devices 11c is implemented by a communication device, and a first state machine 11f for a transmission data and a second state machine 11g for a data receive are incorporated in the communication device 11c. When the communication device 11c is requested to transfer data codes, the first state machine 11f reads out the data codes from the system memory 10b through the bus bridge circuit 11b, and transfers them to a destination.

On the other hand, when data codes arrive at the communication device 11c, the second state machine 11g writes the data codes through the bus bridge circuit 11b into the system memory 10b.

Temporary data storage is required for data transfer. For this reason, a first-in-first-out memory 11h for read-out data and a first-in-first-out memory 11j for write-in data are incorporated in the bus bridge circuit 11b. When the communication device 11c is requested to transmit data codes to a destination, the data codes are transferred from the system memory 10b to the bus bridge circuit 11b and are temporarily stored in the first-in-first-out memory 11h.

On the other hand, when the communication device 11c tries to write data codes into the system memory 10b, the data codes are transferred from the second state machine 11g to the first-in-first-out memory 11j, and are temporarily stored therein.

Assuming now that data codes to be transmitted are stored in the system memory 11b, when the communication device 11c is requested to transfer the data codes to a destination, the first state machine 11f sends a buts request to use the peripheral component interconnect bus 11a, and requests the bus bridge circuit 11b to obtain the right to use the host bus 10c. If the host bus 10c is operative to transfer data codes at low speed or is in busy status, the bus bridge circuit 11b instructs the first state machine 11f to cancel the bus request, and requests it to retry. The bus bridge circuit 11b monitors the status of the host bus 10c, and transfers the data codes from the system memory 10b to the firs-in-first-out memory 11h during the host 10c is not occupied by a component device with a higher priority. The first state machine 11f repeats the bus request, and the bus bridge circuit 11d rejects the bus request, and instructs the first state machine 11f to repeat the retry until the completion of the data transfer from the system memory 10b to the first-in-first-out memory 11h. Upon completion of the data transfer, the bus bridge circuit 11b accepts the bus request from the first state machine 11f, and the data codes are transferred from the first-in-first-out memory 11h through the peripheral component interconnect bus 11a to the first state machine 11f. Thus, the peripheral component interconnect bus 11a is assignable to any component device until the data codes has been stored in the first-in-first-out memory 11h, and the peripheral component interconnect bus 11a is improved in the throughput.

Figure 3:
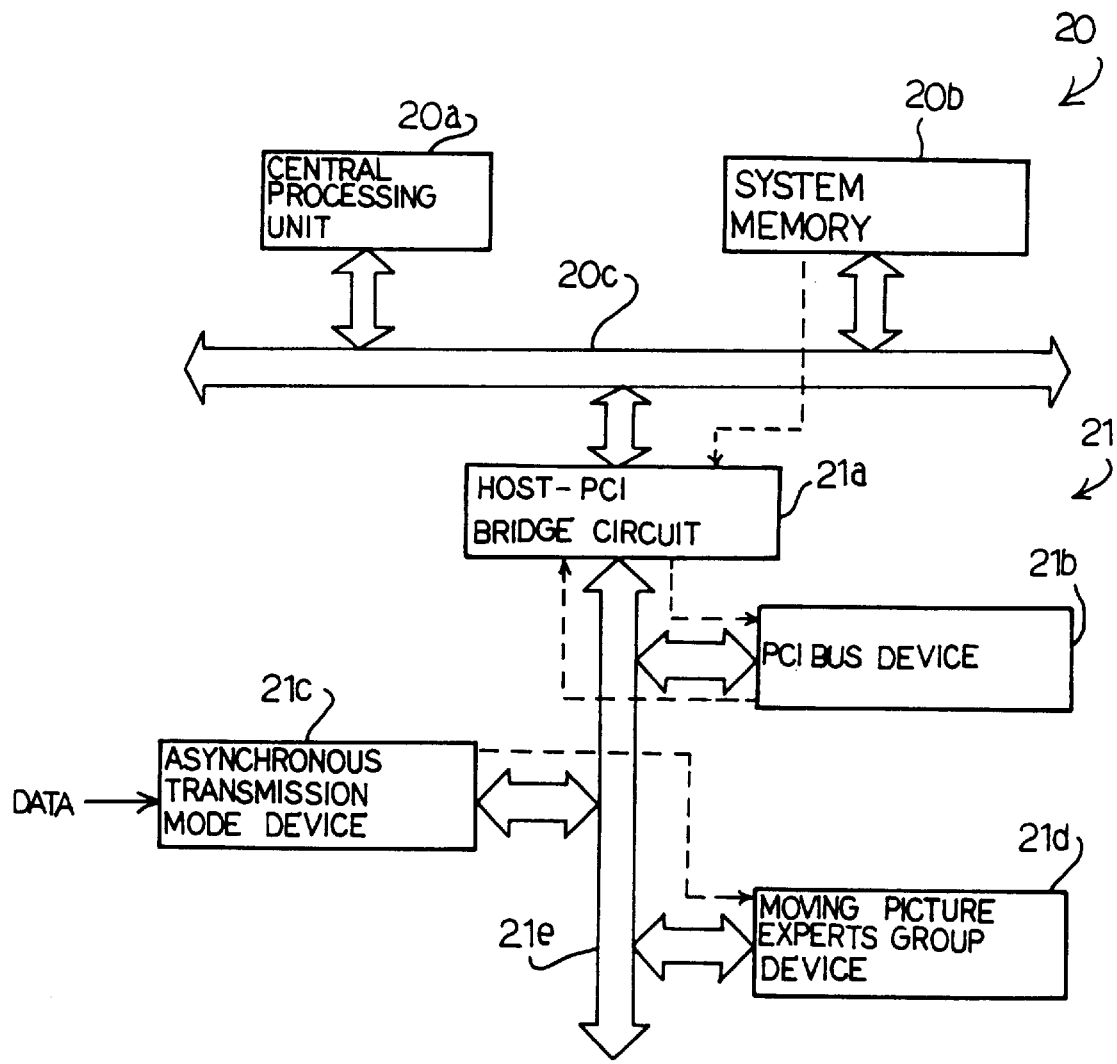
FIG. 3 is a block diagram showing the arrangement of another data processing/communicating system according to the present invention.

If new data codes arrive at the second state machine 11g before the completion of the data transfer to the first-in-first-out memory 11h, the second state machine 11g request the bus bridge circuit 11b to write the new data codes into the system memory 10b. The bus bridge circuit 11b assigns the right to use the peripheral component interconnect bus 11a to the second state machine 11g, and the new data codes are transferred from the second state machine 11g through the peripheral component interconnect bus 11a to the firstn-first-out memory 11j. When the right to use the host 10c is assigned to the bus bridge circuit 11b, the bus bridge circuit 11b writes the new data codes into the system memory 10b. Thus, the new data codes are transferred to the first-in-first-out memory 11j before the data transfer from the first-in-first-out memory 11h to the state machine 11f, and are never lost before the transfer to the system memory Second Embodiment Turning to FIG. 3 of the drawings, a data communication system embodying the present invention largely comprises a main data processing sub-system 20 and a peripheral data processing sub-system 21. The data processing sub-system 20 includes a central processing unit 20a a system memory 20b and host bus 20c connected to the central processing unit 20a and the system memory 20b. The central processing unit 20a fetches data codes stored in the system memory 20b through the host 20c, and process the data information in the data codes. The system memory 20b is shared between the main data processing sub-system 20 and the peripheral data processing 20 and the peripheral data processing sub-system 21.

The peripheral data processing sub-system 21 includes a host peripheral component interconnect bridge 21a, a peripheral component interconnect bus device 21b, an asynchronous transmission mode device 21c, a moving picture experts group device 21d and a peripheral component interconnect bus 21e. The host peripheral component interconnect bridge circuit 21a is a similar in circuit arrangement to the bus bridge circuit 11b, and a first-in-first-out memory for data read-out and a first-in-first-out memory for data write-in are incorporated therein. The asynchronous transmission mode device 21c receives data codes from an external device (not shown), and transfers the data codes to the moving pictures experts group device host peripheral component interconnect bridge circuit 21a as follows.

The peripheral component interconnect bus device 21b is assumed to request the host peripheral component interconnect bridge circuit 21a to assign the right to use the peripheral component interconnect bus 21e and obtain the right to use the host bus 2c. However, the host bus 20c was busy, and the host peripheral component interconnect bridge circuit 21a could not obtain the right to use the host 20c. The host-peripheral component interconnect bridge circuit 21a rejected the bus request for the peripheral component interconnect bus 21e, and instructed the peripheral component interconnect bus device 21b to retry. The peripheral component interconnect bus device 21b repeats the bus request for the peripheral component interconnect bus 21e.

In this situation, new data codes arrive at the asynchronous transmission mode device 21c, and the asynchronous transmission mode device 21c sends the bus request for the peripheral component interconnect bus 21e to the host-peripheral component interconnect bridge circuit 21a in order to transfer the new data codes to the moving picture experts group device 21d. Even though the peripheral component interconnect bus device 21b periodically repeats the bus request, the host-peripheral component interconnect bridge circuit 21a can assign the peripheral component interconnect bus 21e to any other device. For this reason, the asynchronous transmission mode device 21c obtained the right to use the peripheral component interconnect bus 21e, and the new data codes are transferred through the peripheral component interconnect bus 21e to the moving picture experts group device 21d. The moving picture experts group device 21d processes the data information contained in the new data codes. Upon completion of a data transfer from the system memory 20b to the first-in-first-out memory for data read-out the host-peripheral component interconnect bridge circuit 21a allows the peripheral component interconnect bus device 21b to use the peripheral component interconnect bus 21e, and the data codes are transferred from the first-in-first-out memory for data read-out to the peripheral component interconnect bus device 21b through the peripheral component interconnect bus 21e.

If the asynchronous transmission mode 21c is requested to transfer the new data codes to the system memory 20b in the same situation, the asynchronous transmission mode device requests the host-peripheral component interconnect bridge circuit 21a to assign the right use the peripheral component interconnect bus 21e and obtain the right to use the host 20c. Even though the right to use the host bus 20c has been assigned to the host-peripheral component interconnect bridge circuit 21a, the host-peripheral component interconnect bridge circuit 21a assigns the right to use the peripheral component interconnect bus 21e to the asynchronous transmission mode device 21c, and stores the new data codes into the first-in-first-out memory for data write-in.

When the host-peripheral component interconnect bridge circuit 21a obtains the right to use the host bus 20c, the data codes are transferred from the first-in-first-out memory for data write in to the system memory 20b through the host bus 20c, and are stored in the system memory 20b.

As will be appreciated from the foregoing description, the bus bridge circuit according to the present invention has at least two temporary data memories used for a data write-in and a data read-out, respectively, and assigns the right to use the peripheral component interconnect bus to any one of the component devices connected to the peripheral component interconnect bus 21c during a data transfer to the first-in-first-out memory for read-out. For this reason, the peripheral component interconnect bus is improved in throughput.

Moreover, the component device equipped with two status machines can write new data codes into the first-in-first-out memory for data write-in during the repetition of the bus request for the data transfer from the first-in-first-out memory for data read-out to the other status machine. This results in not only the improvement of the throughput but also prevention of lost data.

Although particular embodiments of the present invention have been shown and described, it will be obvious to those skilled in the art that various changes and modifications may be made without departing from the spirit and scope of the present invention. For example, the first-in-first-out memories may be replaced with another kind of temporary data storage. The host-peripheral component interconnect bridge circuit 21a may have only the first-in-first-out memory for data read-out in so far as the data codes are transferred from the asynchronous transmission mode device 21c to another component device 21b/21d.

What is claimed is:

1. A data processing system comprising:
   a first data processing sub-system including
      a memory for storing first pieces of information,
      a bus connected to said memory for propagating said first pieces of information from said memory, and
      a first component device connected to said bus, having a first priority and communicable through said bus with said memory; and
   a second data processing sub-system including
      a peripheral component interconnect bus for propagating said first pieces of information and second pieces of information,
      at least one second component device connected to said peripheral component interconnect bus and supplying said second pieces of information to said peripheral component interconnect bus, and a bus bridge circuit connected to said bus and said peripheral component interconnect bus, having a second priority lower than said first priority, a first temporary memory for storing said first pieces of information and assigning a right to use said peripheral component interconnect bus to said at least one second component device so as to allow said at least one second component device to transfer said second pieces of information to said peripheral component interconnect bus until a data transfer of said first pieces of information to said first temporary memory is completed, and a second temporary memory for storing said second pieces of information supplied through said peripheral component interconnect bus and transferring said second pieces of information therein to said memory so as to store said second pieces of information therein, wherein said at least one second component device has a first state machine requesting said right to use said peripheral component interconnect bus to said bus bridge circuit for receiving said first pieces of information supplied from said first temporary memory to said peripheral component interconnect bus when said bus bridge circuit assigns said right thereto, and a second state machine requesting said right independently on said first state machine for supplying said second pieces of information through said peripheral component interconnect bus to said second temporary memory when said bus bridge circuit assigns said right thereto.

2. The electronic system as set forth in claim 1, in which said first state machine communicates with an external device so as to send said first pieces of information thereto, and said second state machine communicates with an external device so as to receive said first pieces of information therefrom.

3. The electronic system as set forth in claim 1, in which said second data processing sub-system further includes a third component device connected to said peripheral component interconnect bus and receiving said first pieces of information from said peripheral component interconnect bus when said bus bridge circuit assigns said right to said at least one second component device.

4. The electronic system as set forth in claim 3, in which said at least one second component device and said third component device are an asynchronous transmission mode device and a moving picture experts group device, respectively.

* * * * *